Jan. 31, 1950 J. R. HASELY 2,495,894
ANIMAL TRAP
Filed June 25, 1948 2 Sheets-Sheet 2

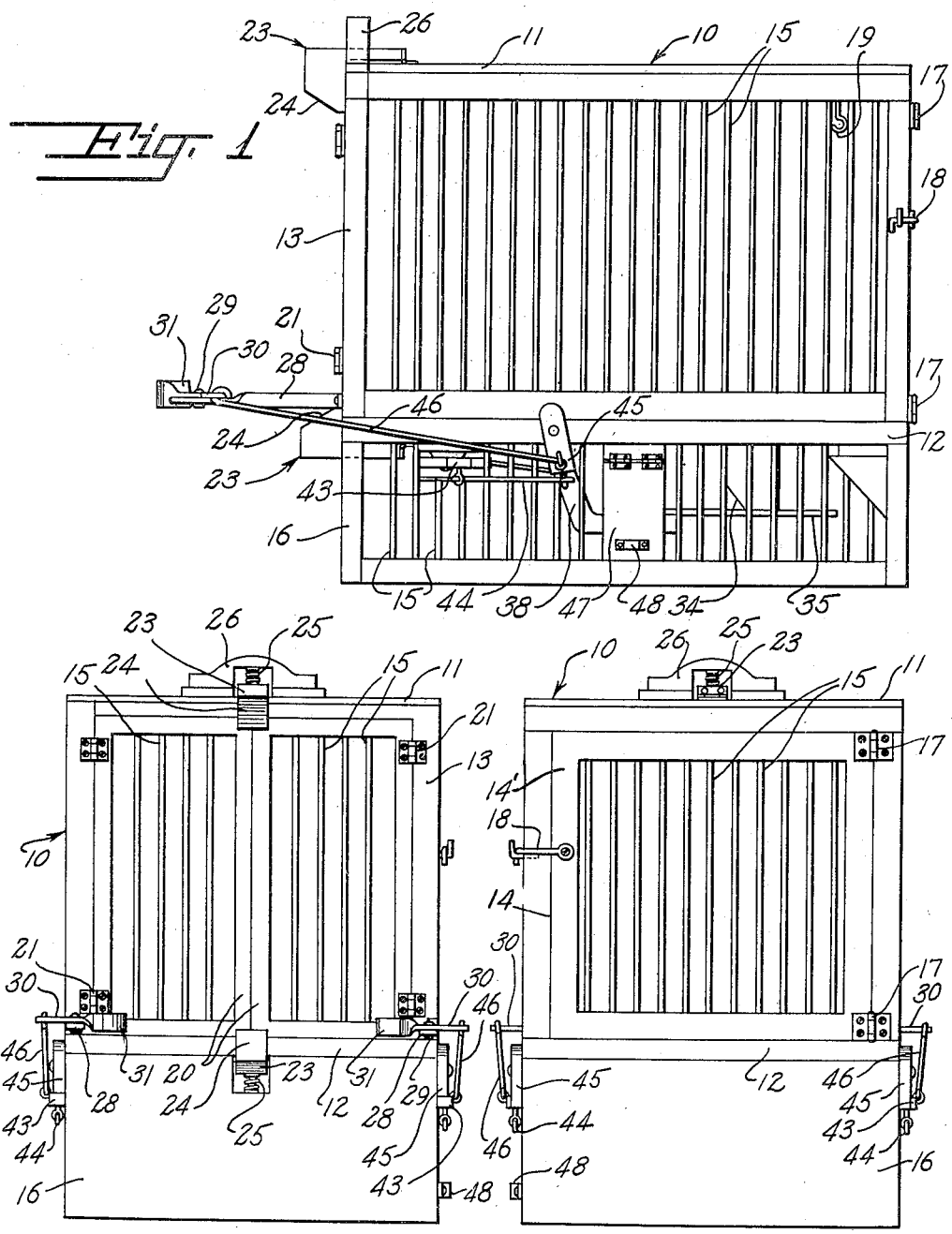

INVENTOR.
Joe R. Hasely
BY
McMorrow, Berman & Davidson
Attorneys

Patented Jan. 31, 1950

2,495,894

UNITED STATES PATENT OFFICE 2,495,894

ANIMAL TRAP

Joe Robert Hasely, Rock Springs, Wyo.

Application June 25, 1948, Serial No. 35,113

5 Claims. (Cl. 43—61)

My invention relates to traps for animals, and more particularly to those of the cage type which are adapted to capture unharmed animals of all sizes.

With the foregoing in view, it is an object of my invention to provide an improved animal trap of the cage type.

A further object is to provide an improved animal trap of the cage type which includes an end wall formed to provide an entrance opening, double doors for closing said opening, means for locking said doors automatically in a closed position, spring means loading said doors for movement in closing directions, a trigger within said cage, and linkage means including releasable latches operatively connecting said trigger to said doors when said doors are in open positions, said latches being operative to lock said doors in open positions, but being releasable upon actuation of said trigger to permit the closing of said doors by said spring means.

A further object is to provide an improved animal trap of the cage type which includes double entrance doors, and which includes a single latch means simultaneously engaging both doors to lock the same in closed positions, said latch means being operative automatically upon closing of said doors.

A further object is to provide an improved animal trap of the cage type which includes novel trigger-actuated linkage means for springing the trap.

Other objects and advantages reside in the particular structure of the invention, combination and arrangement of the several parts thereof and will be readily understood by those skilled in the art upon reference to the attached drawing, wherein the invention is shown, and to the following specification wherein the invention is described and claimed.

In the drawings:

Figure 1 is an elevation of a trap according to the invention, the same being shown in the sprung position;

Figure 2 is a front view thereof;

Figure 3 is a rear view thereof;

Figure 4:
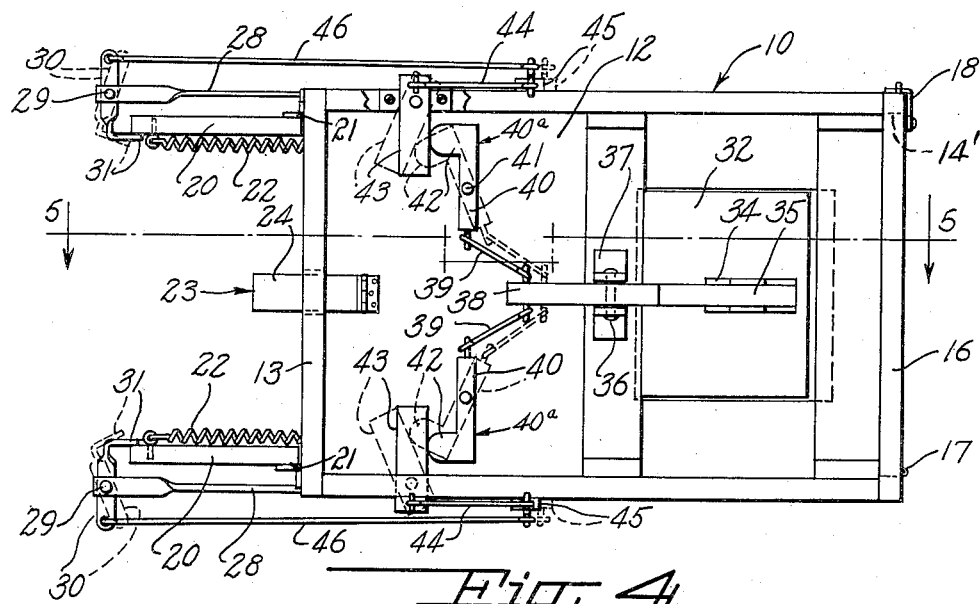
Figure 4 is a bottom plan view thereof, the trap being shown in the set position.

Referring specifically to the drawings, wherein like reference characters have been used throughout the several views to designate like parts, 10 designates generally the trap according to the invention which includes a cage comprising a top wall 11, a floor 12, a rear wall 14 and a front wall 13. The trap is preferably supported on any suitable base 16 in vertically-spaced relation to a supporting surface. The walls of the supporting frame, as well as the walls of the cage except the top wall 11 and the bottom wall 12, are preferably defined by vertically-disposed bars or the like 15.

The rear wall 14 is formed to provide an access door 14' which is hinged to the side walls, as at 17, and locked to the opposite side wall by any suitable lock or latch means 18. The purpose of the rear door 14 is to allow the trapper to enter the trap from the rear thereof either for the purpose of setting the same, and/or replenishing the bait, and likewise provides a convenient means for removing trapped animals from the trap. Bait is adapted to be supported in the trap adjacent the rear door 14 by any suitable means, such as the hook 19 carried by the under surface of the top wall 11.

The front wall 13 of the cage is provided with an entrance opening adapted to be closed by double doors 20 which are pivoted, as at 21, for horizontally outward swinging movement. Relatively powerful springs 22 are fixed to the inner surfaces of the doors 20 adjacent their free edges with the rear ends of the springs suitably anchored to the side walls of the cage. The springs 22 load the doors 20 for movement in closing directions. To retain the doors 20 in closed positions, there have been provided upper and lower latch members 23. Each of the latch members 23 includes a cam surface 24 engageable with an edge of both doors as the doors are moved to closed positions and keeper portions 27, Figure 5, which engage adjacent portions of the outer surfaces of both doors when the doors are closed to retain them in the closed positions. Suitable springs 25 load the latches for movement in locking directions and at least the upper latch is suitably mounted in any suitable guideways 26 which also provide housings for the springs 25. The lower latches 23 may have the springs positioned in recessed portions of the supporting frame 16, Figures 2 and 5. As is obvious from the foregoing, the springs 22 load the doors for closing movement and, once the doors are closed, the latches 23 which have been depressed and elevated, respectively, by engagement with the lower and upper edges of the doors, spring toward each other to engage the keeper portions 27 over the forward surfaces of adjacent doors to lock the same closed.

To hold the doors 20 in the open positions, I have provided a pair of arms 28 which extend forwardly of the front end of the trap in the region of the floor 12 thereof. Each of the arms 28 has pivoted thereon by any suitable pivot means 29 a latch lever 30 which includes a latch dog 31 adapted to engage the free end edge of each door when the same is in the open position to retain the same against closing under the influence of the springs 22. To release the latches 30 from engagement with the doors 20, I have provided suitable trigger and linkage means now to be described.

The floor 12 of the cage is provided with a pedal 32 adjacent the rear door 14 and which pedal is pivoted by any suitable means 33 for vertical movement. The under surface of the pedal 32 is provided with a depending cam 34 which slidably engages one arm 35 of a two-armed rock lever. Such rock lever is pivotally mounted on the under surface of the floor 12 of the cage by any suitable pivot and bracket means 36 and 37, respectively. The arrangement is such that the rock lever rocks in a vertical plane. The forward arm 38 of the rock lever is upwardly directed, Figure 5, and is pivotally connected in any suitable manner to a pair of links 39 providing a yoke. The links 39 are forwardly directed and their forward free ends are pivotally connected in any suitable manner to the inwardly-directed free ends of the arms 40 of a pair of rock levers 40a which are pivoted, as at 41, to the floor 12 of the cage for pivotal movement in a horizontal plane. The opposite or outer arms of the last-named rock levers are formed to provide forwardly directed cams 42 which slidably engage the rear surfaces of the inner and longer arms of a second pair of horizontally pivotal rock levers 43. The outer or shorter arms of the last-named rock levers 43 are pivotally connected, as by links 44 to the lower ends of a pair of vertically pivotal levers 45. Such levers 45 are in turn connected by links 46 to the latch levers 30, as is readily apparent from Figures 1 and 4.

Figure 5:
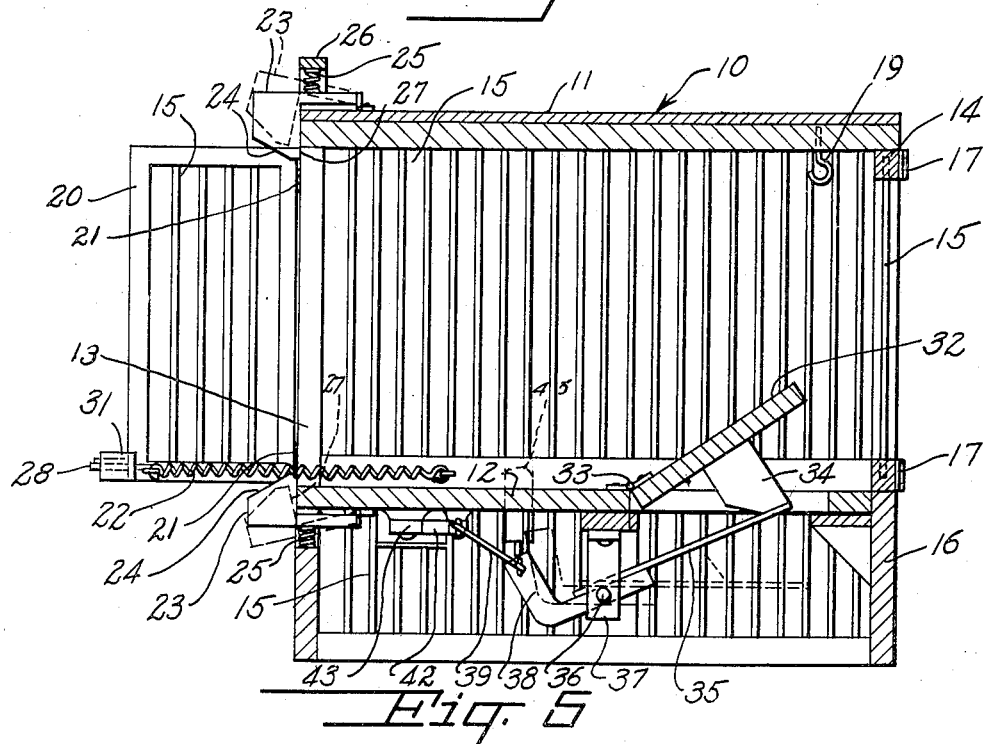
Figure 5 is a longitudinal vertical section taken substantially on the planes of the line 5—5 of Figure 4.

Referring to Figure 4, and also to Figure 5, it is readily apparent that upon setting of the trap, the parts are in the full line position with the pedal 32 raised and the rear arm 35 of the first-named rock lever likewise raised and slidably engaging the cam 34. When an animal enters the cage, and attempts to obtain bait from the hook 19, it is inevitable that the animal step upon the pedal 34, whereby to depress the same and rock the first-named rock lever vertically. Such movement moves the parts to the broken line position, Figure 4 and Figure 5, whereby the yoke-providing links 39 move rearwardly and take with them the inner ends of the inner arms 40 of the second-named rock levers. Such movement extends the cams 42 thereof forwardly and slidably cams the second pair of horizontally pivoted rock levers 43 forwardly. This action extends the outer short ends of the last-named pair of levers rearwardly and in turn through the links 44 rock the last-named rock levers 45 rearwardly. This last movement pulls the last-named links 46 rearwardly, whereby to actuate the latches 30 in a direction to release the latch dogs 31 thereof from engagement with the doors 20. Thereafter, the springs 22 close the doors with a snap action and the doors are latched closed in the manner already described. Thus, the animal is securely trapped in the cage and may be removed therefrom at the trapper's leisure.

It should be understood that the trap according to the invention may be made in many sizes from relatively small and relatively fragile devices for the capture of small game, such as rabbits or the like, up to rather large structures of great strength which are adapted to trap big game, such as lions, bears and the like.

It should be noted that virtually all of the linkage for actuating the trap is positioned below the cage in the enclosure provided by the base 16. Access to such space may be readily had by any suitable door 47 formed in the base 16, Figure 1. Thus, the parts are protected against damage by prowling animals and also from damage incident to the action of the elements. Door 47 may be opened by handle 48.

While I have shown and described what is now thought to be a preferred embodiment of the invention, it is to be understood that the same is susceptible of other forms and expressions. Consequently, I do not limit myself to the precise structure shown and described except as hereinafter claimed.

I claim:

1. A trap, comprising a cage including a floor and spaced front and rear end walls, said front end wall being formed to provide an entrance opening therein, a pair of horizontally outwardly-swingable doors for said opening, spring means loading said doors for closing movement, an upper and a lower latch on said cage, each latch simultaneously engaging portions of both doors to lock the same in closed positions, a pair of laterally-spaced arms fixed to said cage and extending forwardly of said front wall, a latch carried by each arm, each of said last latches being engageable with an open door to lock the same in an open position, a movable trigger in said cage adjacent said rear wall, and means operatively connecting said trigger to both of said last-named latches, and said last means being operative to release both of said last latches simultaneously upon movement of said trigger in at least one direction.

2. A trap, comprising a cage including a floor and spaced front and rear end walls, said front end wall being formed to provide an entrance opening therein, a pair of horizontally outwardly-swingable doors for said opening, spring means loading said doors for closing movement, an upper and a lower latch on said cage, each latch simultaneously engaging portions of both doors to lock the same in closed positions, a pair of laterally-spaced arms fixed to said cage and extending forwardly of said front wall, a latch carried by each arm, each of said last latches being engageable with an open door to lock the same in an open position, a pedal pivotally mounted on said floor adjacent said rear wall, and linkage operatively connecting said pedal to both of said last-named latches, said linkage being operative to release simultaneously both of said last-named latches from engagement with said doors upon depression of said pedal.

3. A trap, comprising a cage including a floor and spaced front and rear end walls, said front end wall being formed to provide an entrance opening therein, a pair of horizontally outwardly-swingable doors for said opening, spring means loading said doors for closing movement, means automatically locking said doors in closed positions, a pair of laterally-spaced arms fixed to said cage and extending forwardly of said front wall, a latch carried by each arm, each of said latches being engageable with an open door to lock the same in an open position, a movable trigger in said cage adjacent said rear wall, and means operatively connecting said trigger to both of said latches, and said means being operative to release both of said latches simultaneously upon movement of said trigger in at least one direction.

4. A trap, comprising a cage including a floor and spaced front and rear end walls, said front end wall being formed to provide an entrance opening therein, a pair of horizontally outwardly-swingable doors for said opening, spring means loading said doors for closing movement, means automatically locking said doors in closed positions, a pair of laterally-spaced arms fixed to said cage and extending forwardly of said front wall, a latch carried by each arm, each of said latches being engageable with an open door to lock the same in an open position, a pedal, means pivotally mounting said pedal on said floor adjacent said rear wall, a cam fixed to said pedal and extending downwardly therefrom through said floor, a two-armed rock lever, means mounting said rock lever below said floor for vertical pivotal movement, one arm of said rock lever slidably engaging said cam for actuation thereby upon depression of said pedal, a yoke pivoted to the other arm of said rock lever, and linkage operatively connecting said yoke to both of said latches whereby to release both latches simultaneously upon depression of said pedal.

5. A trap, comprising a cage including a floor and spaced front and rear end walls, said front end wall being formed to provide an entrance opening therein, a pair of horizontally outwardly-swingable doors for said opening, spring means loading said doors for closing movement, means automatically locking said doors in closed positions, a pair of laterally-spaced arms fixed to said cage and extending forwardly of said front wall, a latch carried by each arm, each of said latches being engageable with an open door to lock the same in an open position, a pedal, means pivotally mounting said pedal on said floor adjacent said rear wall, a cam fixed to said pedal and extending downwardly therefrom through said floor, a two-armed rock lever, means mounting said rock lever below said floor for vertical pivotal movement, one arm of said rock lever slidably engaging said cam for actuation thereby upon depression of said pedal, a yoke pivoted to the other arm of said rock lever, said yoke including a pair of forwardly-directed arms, a pair of laterally-spaced two-armed rock levers, means mounting said last levers for horizontal pivotal movement, means pivotally connecting each arm of said yoke to an arm of said last levers, the other arms of said last levers having free ends formed to provide cams, and linkage engageable with said last cams for actuation thereby upon depression of said pedal, said linkage being operative upon actuation to release both of said latches simultaneously.

JOE ROBERT HASELY.

REFERENCES CITED

The following references are of record in the file of this patent:

UNITED STATES PATENTS

| Number | Name | Date |
|---|---|---|
| 907,837 | Mathias | Dec. 29, 1908 |
| 1,065,835 | Power | June 24, 1913 |
| 1,522,375 | Kruszynski | Jan. 6, 1925 |